Feb. 9, 1932.   P. HANSMANN ET AL   1,843,977
PLOW
Original Filed Sept. 15, 1927   7 Sheets-Sheet 6

Inventors
Paul Hansmann and
Herman Strack
By
Attorney

Feb. 9, 1932. P. HANSMANN ET AL 1,843,977

PLOW

Original Filed Sept. 15 1927 7 Sheets-Sheet 7

Inventors
Paul Hansmann
and
Herman Strack
By
Attorney

Patented Feb. 9, 1932

1,843,977

UNITED STATES PATENT OFFICE

PAUL HANSMANN AND HERMAN STRACK, OF LONG PRAIRIE, MINNESOTA; SAID STRACK ASSIGNOR TO SAID HANSMANN

PLOW

Refiled for abandoned application filed September 15, 1927, Serial No. 219,672. Divided and this application filed November 14, 1930. Serial No. 495,674.

This invention relates to plows, and more particularly to plows wherein the plow beams are individually connected to a supporting frame for independent, vertical, and lateral swinging movement, and having means whereby the forward ends of the plow beams are rendered movable vertically to tilt the shares upon their heels.

This invention has among its objects to provide means functioning during the lifting and lowering of the plow to relieve the manually operated actuating means from the pulling strain transmitted from the horses or other draft element.

Among other objects is the providing of means utilizing a portion of the draft stresses so as to lessen the strain transmitted to the plow controlling mechanism, thereby facilitating the operation of that mechanism; to provide means for independently and conveniently bringing about vertical adjustment of the plows; and to provide means for relatively regulating the supporting wheels with respect to the plow frame to maintain the plows in a horizontal plane, with the wheels of the plow in vertically offset positions.

Other objects and advantages will be pointed out as this specification progresses, the invention consisting in the construction, combination, and arrangement of parts hereinafter described and specifically claimed.

While the features of invention, as shown in the drawings herein, are embodied in a gang plow, it is not the intention to limit the invention to such embodiment, as a one-unit plow may be constructed within the scope of our invention.

The subject matter of the present invention is that disclosed in our abandoned application Serial Number 219,672, filed September 15, 1927, of which the present case is a substitute.

As shown in the drawings, a plow, or plows, are supported upon a wheeled frame A, frame comprising a front cross bar 2, a rearwardly extending side bar 3 joined at its forward end to the cross bar, and a diagonal brace member 4 connecting the cross bar 2 and the side bar 3, with the side bar 3 extending an appreciable distance rearwardly beyond the diagonal brace member 4. Supported, one upon each end of the front cross bar 2, are vertically disposed bearing members 5, in which vertical posts 6 of a pair of supporting wheels 7 are slidably and pivotally mounted. As shown, the lower ends of the posts 6 are bent first rearwardly and then outwardly to form axle supports for wheels 7. The posts 6 are held in vertically adjusted positions in relation to the bearings 5 by the following described mechanism;

Secured upon the upper end of each of the posts 6 is a toothed quadrant and lever-supporting member 8, the quadrant 9 projecting rearwardly from the support member 8. A lever arm 10 has fulcrum support 11 upon each supporting member 8, each lever carrying an ordinary manually controlled pawl mechanism 12 to cooperate with the toothed quadrant and hold the lever in adjusted positions. Each lever 10 at its lower end has a forwardly extending arm 13 connected by a rod 14 to the frame work. Thus, by turning either of the levers 10 rearwardly about its fulcrum 11, that side of the frame will be raised upon the supporting post while a reverse movement of said levers will lower the frame upon the supporting posts. The above described mechanism permits independent adjustment of the sides of the frame, and thus the frame and plows may be kept in an even, horizontal position, as shown, with the wheels in varying vertical positions.

Figure 1:
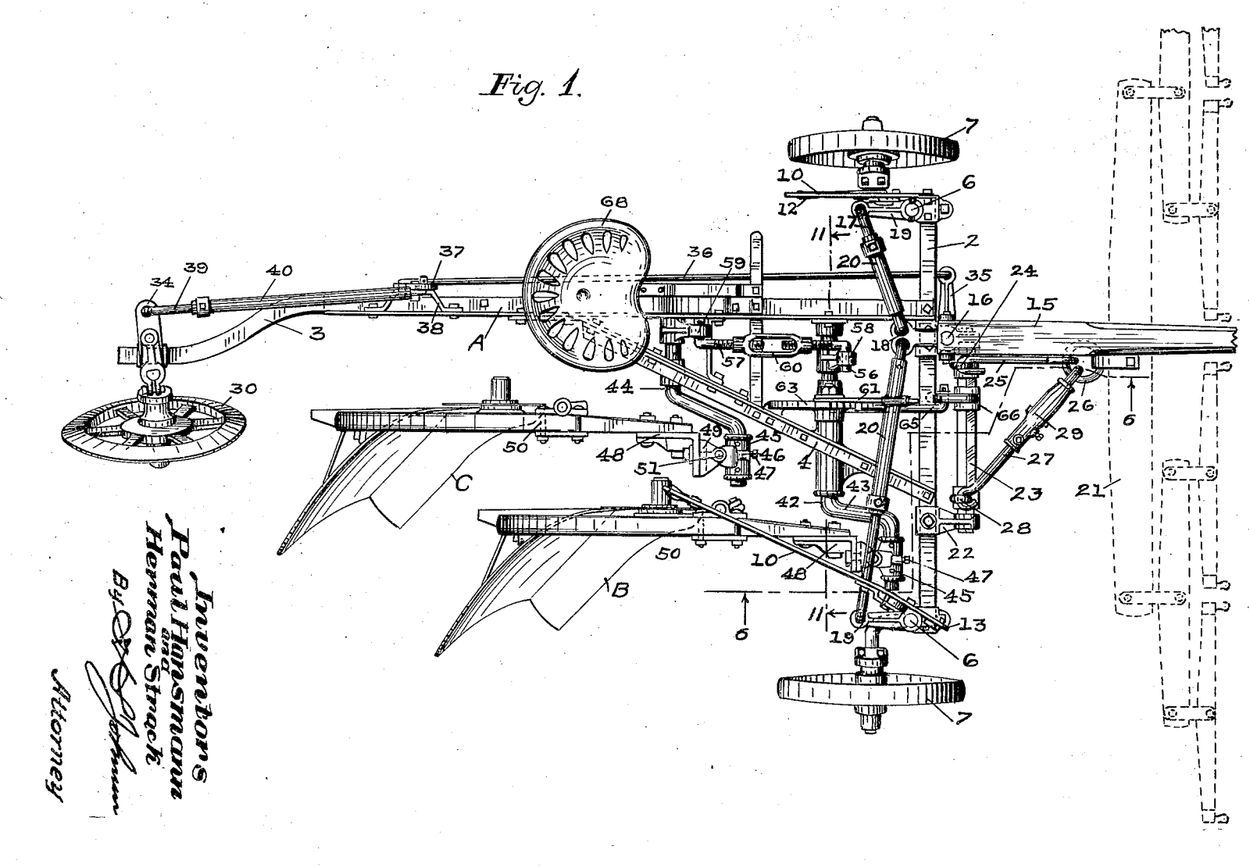
Figure 1 is a plan view of a gang plow embodying the features of the present invention, with the plows in operative position and the draft rigging indicated by dotted lines.
Figure 3:
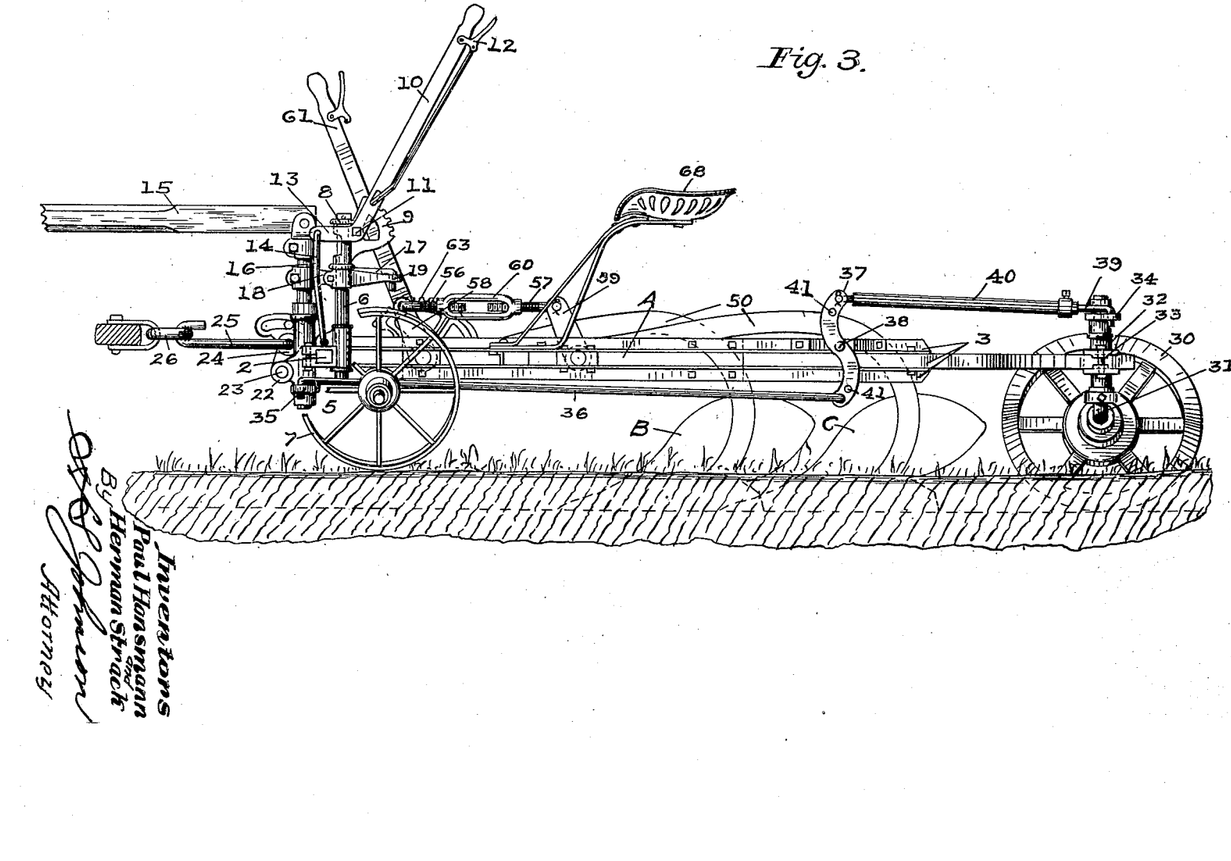
Figure 3 is a view in elevation of the left hand side thereof with the parts in the same positions as illustrated in Figures 1 and 2 with some of the parts omitted and some broken away to show a rear wheel control and adjustment and the left front wheel post.
Figure 4:
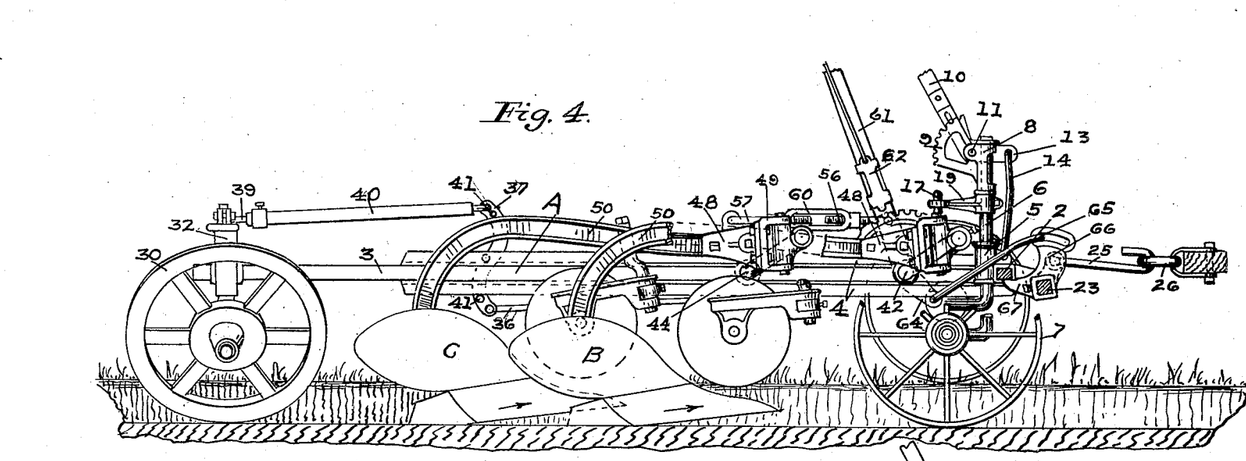
Figure 4 is a view in elevation of the right hand side thereof with some parts omitted and some broken away to show the position the plows assume due to the pull of the draft element when the control lever latch is released and a segmental lever is brought into contact with a cross bar of the frame.
Figure 5:
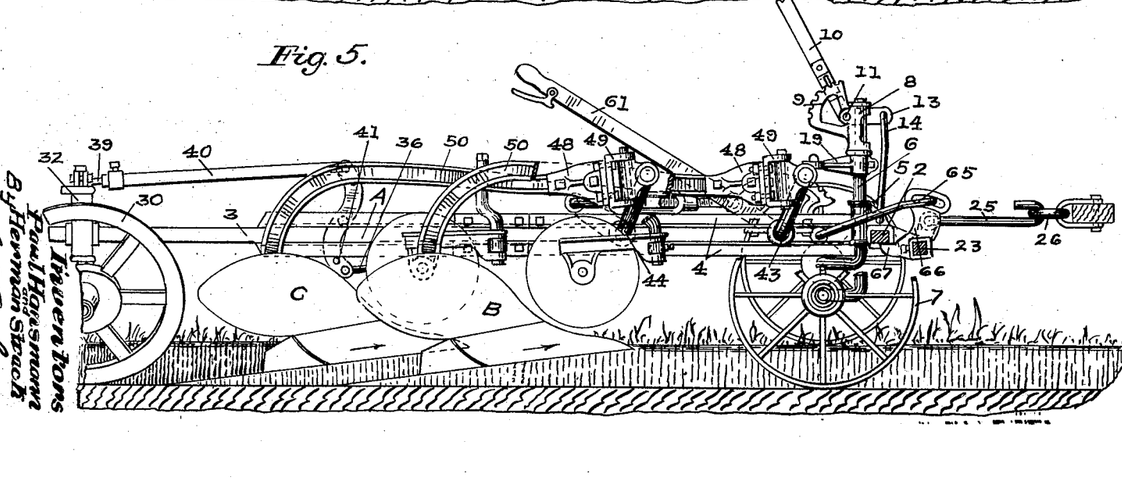
Figure 5 is a view in elevation corresponding to that shown in Figure 4 with the plows further tilted due to the pull on a plow supporting crank which has passed beyond dead center, and with the pull rod, which is connected with the segmental lever, loose and in a forward position in the slot of said lever.

In order to steer the plow and control the wheels, a steering pole 15 is provided, supported as shown particularly in Figures 1 and 3, upon the vertical post 16, having suitable journal support on the frame. The wheels are controlled from the steering pole through two adjustable rods 17 connecting the arm 18, projecting rearwardly from the steering post support, with the rear ends of arms 19 projecting rearwardly from the wheel posts 6. The rods 17, as shown, have pivotal support in the rear ends of the arms 18 and 19, the front ends of the arms 19 being suitably keyed, or otherwise rigidly fastened, to the wheel posts 6. In order to permit of a swinging adjustment of the wheels 7, the rods 17 are each provided with an adjusting sleeve 20, so that by adjusting the lengths of the rods 17 by means of the sleeves 20 any desired swinging adjustment of the supporting wheels may be provided.

Where horses are employed for draft power, eveners 21 are connected with the frame work by the following mechanism:

Supported in front of the front cross bar 2 of the frame and below said cross bar by journaled brackets 22 projecting downwardly and forwardly from the cross bar, is a rotatable draft bar 23. An arm 24 (see Figures 1, 6, 7, and 8) projecting upwardly and forwardly from the left hand end of the draft bar 23 has link connection 25 with an evener clevis ring 26. The right hand end of the draft bar is also connected with the clevis ring by means of a rod 27 connecting the clevis ring 26 with an arm 28 projecting upwardly and forwardly from the draft bar, the rod 27 being provided with an adjusting sleeve 29.

Figure 10:
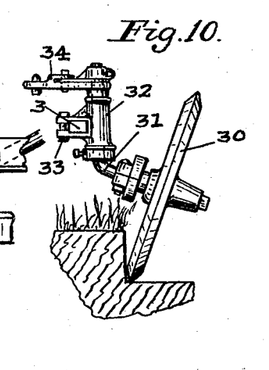
Figure 10 is a detail view of a rear ground element wheel.

Having journal support upon the rear end of the bar 3 is a ground element wheel 30. As shown, particularly in Figure 10, a supporting post 31 of the ground element wheel is fulcrumed in a vertically disposed journal bearing 32, suitably supported upon the bar 3 and adjustable upon said bar through the medium of the adjusting screws 33. Secured upon the upper end of the post 31 is a laterally extending arm 34 connected in the following described manner, with the outer end of an arm 35, which arm 35 projects laterally from the rear end of the steering pole 15. A rod 36 connects the outer end of the arm 35 with the lower end of a lever 37 having central fulcrum support 38 upon the frame bar 3. The upper end of the lever 37 is pivotally connected by a rod 39 with the outer end of the arm 34 secured to the ground element wheel supporting post 31. An adjusting sleeve 40 is provided for the rod 39, to permit adjustment of the ground element wheel 30. Adjustable connections between the rods 36 and 39 and the lever 37 may be secured by providing the lever 37 with a plurality of openings 41. By mounting the ends of the rods 36 and 39, respectively, in openings 41 at different distances from the fulcrum of the lever 37, the relative movement between the arm 35 and the arm 34 can be adjusted.

Figures 11, 12, 13, 14:
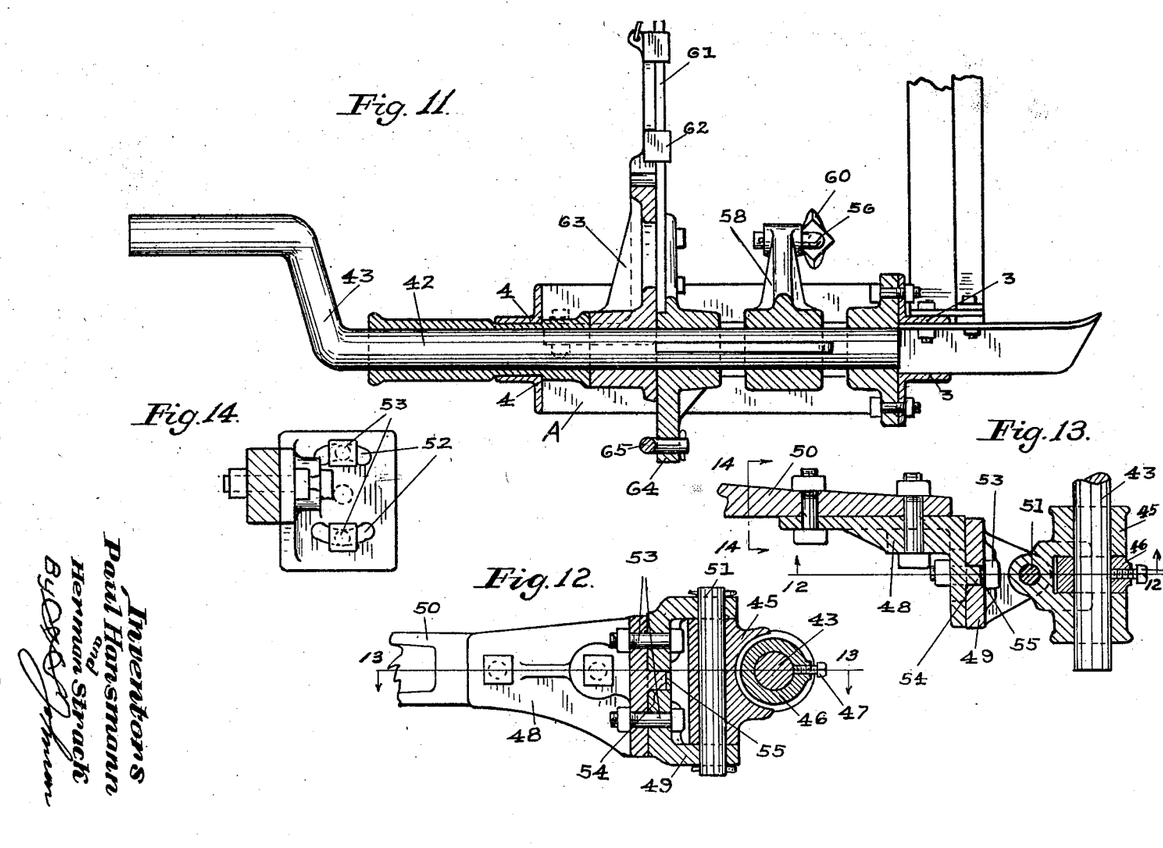
Figure 11 is an enlarged sectional view through a crank shaft on the line 11—11 of Figure 1 to show the supporting bearings with a toothed quadrant mounted loosely on the shaft and bolted to a frame bar and an operating lever hub and lever hub keyed to the shaft.
Figure 12 is a sectional view on line 12—12 of Figure 13.
Figure 13 is a sectional view on line 13—13 of Figure 12.
Figure 14 is a sectional view on line 14—14 of Figure 13; the last three views illustrating the means by which the plow beams are adjusted horizontally.

To support and control the plows B and C the following mechanism is provided:

Journaled in bearings supported by the side bar 3 of the frame and the diagonal brace bar 4 in rear of the front cross bar 2 of the frame is a crank shaft 42, the free end 43 of said shaft being bent forwardly and then outwardly and forming a support at its outer end for the beam 50 of the plow B. Similarly journaled in bearings supported by the side bar 3 of the frame and the diagonal brace bar 4 in rear of the shaft 42 is a crank shaft 44, which shaft at its free end is bent forwardly and outwardly and forms a bearing support at its outer end for the beam 50 of the plow C. These two plows, as shown, are in parallel arrangement, the plow C being positioned rearwardly of the plow B and offset laterally therefrom to form adjacent furrows in a plowing operation. Each plow is supported to swing vertically and horizontally in the following manner:

Mounted rotatably on the end of each crank shaft is a pivot block 45, which block is held positioned upon the shaft by a collar 46, the collar being secured to the shaft by a suitable set screw 47. The supporting, two-part bracket members 48 and 49 of the plow beam 50 have vertical pivotal connection 51 with the pivot block 45. The plow is thus adapted for vertical swinging upon the crank shaft and for horizontal swinging upon the pivot 51. To provide for adjustment of the plow with respect to its support upon the crank shaft, the bracket member 49 is formed with an opposed pair of arcuate slots 52, see Figure 14, through which are inserted bolts 53 connecting the bracket members 48 and 49. The bracket member 48 is formed with a central boss, or projection, 54, projecting into a corresponding central opening 55 in the bracket member 49 to prevent lateral displacement of these members. As will, therefore, be evident, the position of each plow may be laterally adjusted by means of the pivot block 45 upon the crank shaft; and by means of the slotted pivotal connection between the bracket members 48 and 49, the plow may be rotatably adjusted about its longitudinal axis.

Figures 6, 7:
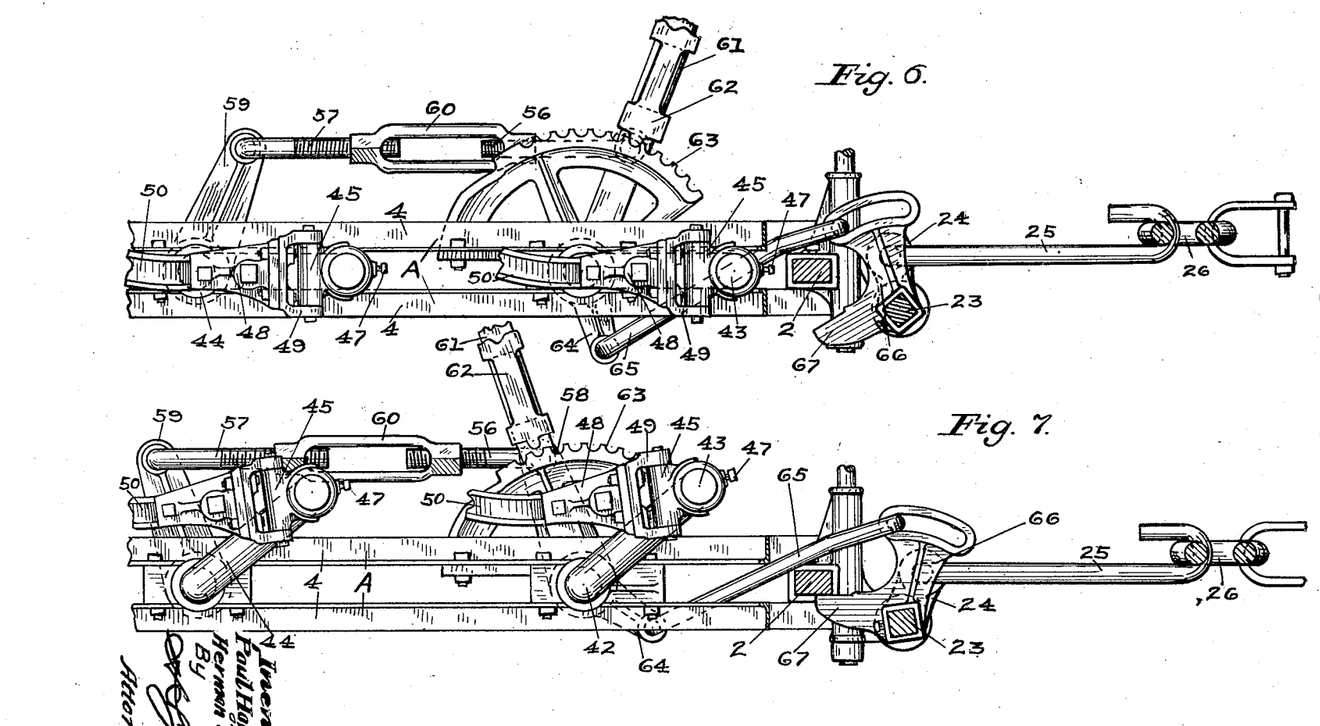
Figure 6 is an enlarged sectional view on the line 6—6 of Figure 1 with the parts in the same relative positions as in Figure 2.
Figure 7 is an enlarged view corresponding to Figure 6, but showing the segmental lever brought into contact with the frame cross bar.

The plows are actuated in carrying them into and out of the ground through the following described mechanism and connections:

Upwardly extending arms 58 and 59 are fixedly connected to the crank shafts 42 and 44, respectively. Rods 56 and 57 are pivoted in the upper ends of said arms and are adjustably connected by a turnbuckle 60. The rotation of the crank shaft 42 thus causes, by means of this connection, a similar rotation of the crank shaft 44. To permit manual rotation of the shaft 42 and by means of the above mechanism, the shaft 44 simultaneously therewith, there is provided a lever 61 keyed to the crank shaft 42 and carrying a manually controlled locking pawl 62 to cooperate with the teeth of a quadrant 63 supported by the frame-work to hold the lever 61 in an adjusted position. Projecting downwardly from the lower end of the lever 61 is an arm 64 connected at its lower end, by a link 65, with a lever arm 66 fixedly mounted upon the draft bar 23. As shown, particularly in Figures 6 and 7, the arm 66 at its upper end is formed with a curved slot, into which the forward end of the link 65 projects, this arm 66 being formed with a lower rearwardly projecting portion 67 which, at a certain point in the operation, as illustrated in Figure 7, contacts with the cross bar 2 to limit the rotation of the arm 66 and with it the draw bar 23. The lever arm 66 is longer than the lever arms 24 and 28 which are connected, by means of the links 25 and 27 which may be considered as constituting a draft element of the mechanism, to the source of motive power which may here be considered as being connected to the eveners 21, although a tractor or other source of motive power may be readily employed, if desired.

Figure 2:
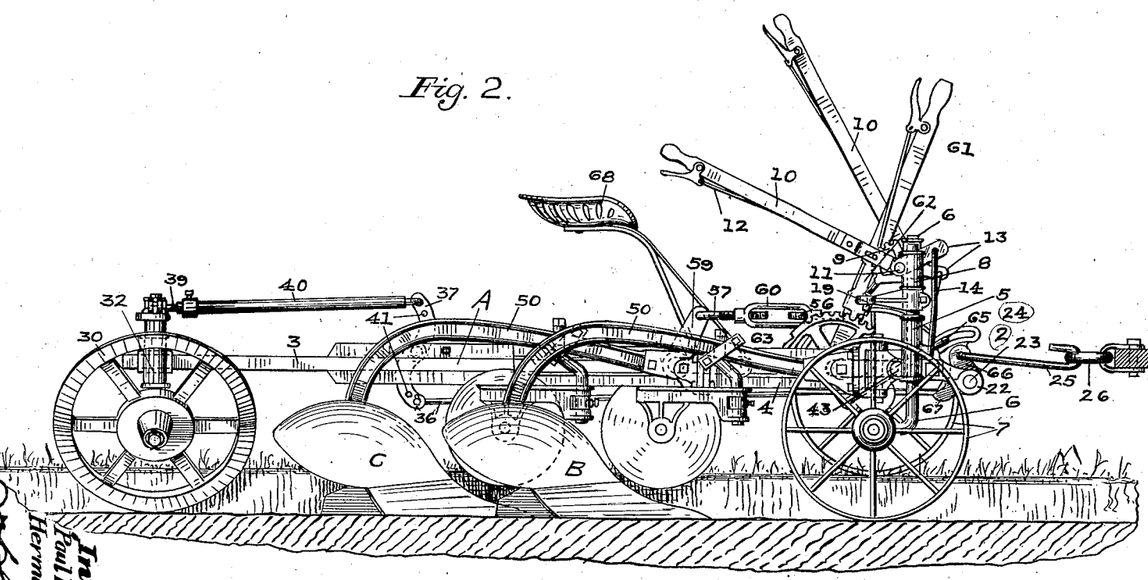
Figure 2 is a view in elevation of the right hand side thereof, with the parts in the same positions as illustrated in Figure 1.

Figures 1 to 3 illustrate the plows in normal, operating positions. In this position of the plows, the lever 61 is in a forward position with reference to the cooperating quadrant 63, locking the draw bar 23 and lever 65 in rearward position, as shown in Figure 6. In this position the plow supporting cranks 43 and 44, will be in a lowered position, lowering the forward ends of the plow beams connected thereto and thereby lowering the plow points to cause them to enter the ground to a plowing position, such as is illustrated in Figures 1 to 3, inclusive. When the plows are in this position and the mechanism is being drawn forward by a suitable source of motive power, the resistance of the earth to the passage of the plows places a powerful rearward stress on the plow beams, which tends to rotate the cranks 43 and 44 rearwardly and downwardly. The forward pull on the arm 64 by the link 65 connected to the arm 66, however, tends to partially counterbalance this rearward pull of the plow beams, and facilitates manually raising the beams by means of the lever 61 and associated parts, when desired. Of course, when the lever 61 is locked in its forward position, as illustrated in Figures 1 to 3 and 6, the forward pull on the lower projection 64 of the lever 61 is prevented from rotating the lever 61 by the rearward pull on the plow beams, and, furthermore, by the engagement of the pawl 62 with the toothed quadrant 63 so that this pulling force which assists in raising the plows during the actual raising thereof, is transmitted to the frame during a plowing operation.

Figure 8:
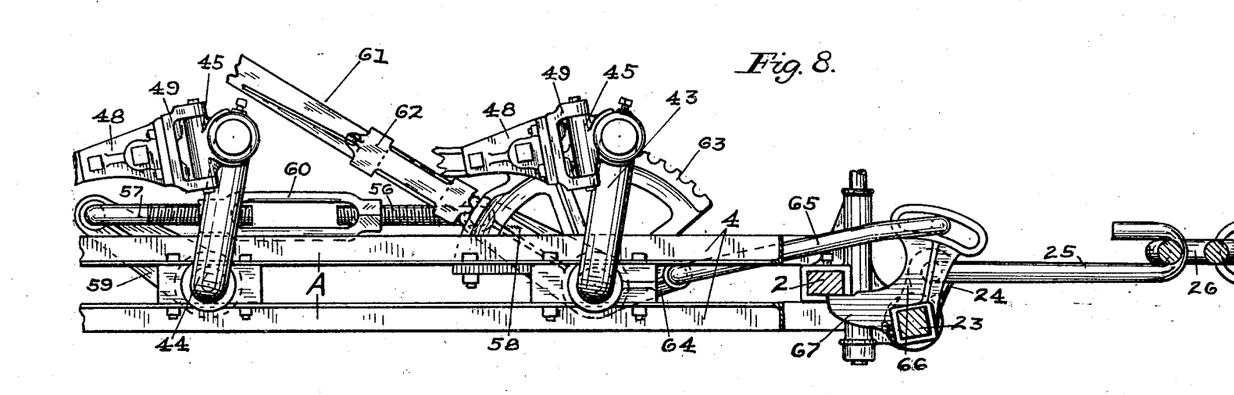
Figure 8 is a view similar to those illustrated in Figures 6 and 7 with the parts in the positions shown in Figure 5.
Figure 9:
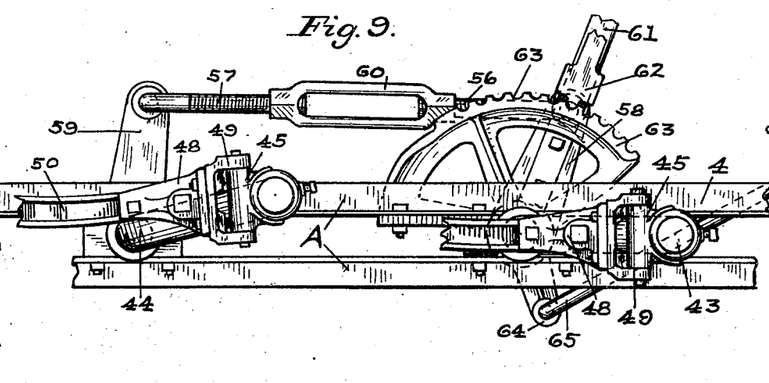
Figure 9 is an enlarged detail view illustrating the adjustment between the crank arms of the two plows.

When it is desired to lift the points of the plows to carry them out of the ground, as illustrated, particularly in Figures 4, 5, 7, and 8, the lever arm 61 is swung backward. During the initial portion of this backward swing, the pull from the draft element is transmitted to the arms 24 and 28 tending to rotate the draft bar 23 clockwise, as illustrated in Figures 6 to 8. This also tends to rotate the arm 66 clockwise and to draw the link 65 forwardly, thus assisting in the rearward movement of the lever 61 by the operator. As the lever 61 is pulled back, it will be evident, as illustrated in Figure 7, that the lower projecting end of the lever arm will be swung forward, permitting continued pull from the draft element to turn the portion 67 of the lever 66 into engagement with the front cross bar of the frame, as shown in Figure 7. By the time the projection 67 engages the cross bar 2 of the frame, the crank shafts 43 and 44 will have passed dead center and thereafter the pull of the plow beams will assist in further raising the plows from the ground so as to make unnecessary any further action of the lever 66 and the link 65 for this purpose. While the projection 67 of the lever 66 is in contact with the cross bar 2, as shown in Figure 7, all of the pulling strain transmitted through the draft element is transmitted to the plow frame and none is transmitted to the link connection 65. With the stop lug in the position shown in Figure 7, the continued rearward swing of the lever 61 and continued lifting of the points of the plows will be permitted by the slotted connection between the link 65 and the lever 66. This is of great advantage both in the lifting and lowering of the plow. The above relieves the strain upon the operator, as the operator is not, during the initial movement of the lever arm in the raising operation, or in the final movement of the lowering operation, handling the lever against the pull of the draft means. By varying the relative lengths of the levers 24 and 28 and the lever 66 any desired portion of the pull of the draft element may be transmitted to the lever 61 to assist in raising the plows.

By reason of the above described features of invention, it is possible to readily perform the operation of lowering and raising the plows without stopping the plow or without undue strain on the operator.

The principal function of the ground element wheel during a plowing operation is to create a lateral force which is opposed to the side draft of the plows. This side draft is a lateral force and is a well known characteristic of mould board type plows and is produced by the pressure of the earth against the mould board as the mould board raises and turns the earth during a plowing operation. The ground element wheel may be positioned to ride against the land side of a furrow and in this manner resist the lateral force of the side draft, although other types of ground elements to resist side draft are well known to the art, and, inasmuch as the ground element wheel itself does not constitute one of the features of the present invention, it is not desired to limit the invention to embodiment with any particular type of ground element wheel for this purpose.

Among other important advantages of the construction described and shown are the means for leveling the frame. By means of the slidable supports of the wheels and the actuating levers therefor either side of the frame may be quickly adjusted vertically with reference to the wheel for that side so that one wheel may travel upon a higher level than the other, as illustrated in Figure 2, with the plows remaining level.

By means of the adjustable connections between the wheel posts and steering pole, the apparatus is conveniently steered from the pole and adjustments may be easily made in the wheel alinement. By means of the adjustable connection between the crank shafts of the two plows, the relative depth of travel of the plows may be easily regulated, and, by means of the supporting connections above described for the plow beams upon the crank shafts, the plow beams may be easily adjusted laterally upon the crank shafts, and by means of the adjustable support for the plow beams, particularly shown in Figure 14, the plow may be adjustably rotated about its longitudinal axis with reference to its support to hold it in proper plowing position. By means of the adjustable connection between the steering pole and the ground element wheel 30 the traveling position of the ground element wheel may be regulated.

The described features of invention are of particular importance in a plow of this character, wherein the plows are supported to swing freely laterally and vertically during the plowing operation at one side of the center of draft and the side draft counter-balanced as by means of a ground element wheel supported at the rear of the plow.

While the construction is herein illustrated and described as horse-drawn, other draft means may be employed within the scope of the invention.

With respect to the connection of the draft means with both the frame and the plow and the means for operatively disconnecting the draft means from the plow at a certain point in the lifting operation of the plow, it will be evident that up to the time that the plow is being lifted the draft means is through its connections pulling upon the plow and lifting lever of the plow in a manner to assist in starting the lifting operation; whereas, after the projection from the lever 66 comes in contact with the frame cross bar there is no further pull upon the plow operating lever by the draft means. As pointed out, this relieves the strain upon the operator handling the lifting lever, both in the initial lifting of the plow and in the final lowering of the plow.

We claim:

1. A plow mechanism, comprising in combination, a wheeled frame, plow support means pivotally mounted thereon, a plow, a beam connected to said plow and having journaled connection with said plow support means, a draft element, means operatively connecting said draft element to said frame and to said plow support means to exert an upward force on said plow support means.

2. A plow mechanism, comprising in combination with a wheeled frame, a plow, a crank shaft, a plow beam connected to said plow and journaled on said crank shaft, a draft element, and means operatively connecting said draft element to said frame and to said crank shaft to tend to raise said plow beam during a plowing operation.

3. A plow mechanism, comprising in combination, a frame, a pair of forward support wheels therefor, a plow, a crank shaft pivotally mounted in said frame, and having vertical and lateral pivotal connection to said plow, manually operated means operatively associated with said crank shaft to secure said crank shaft in an adjusted position, a ground engaging element adjustably mounted rearwardly on said frame, steering means adjustably connected to said forward support wheels and to said ground element wheel, a draft element, and offset lever means connected to said draft element and to said crank shaft tending to raise said plow during a plowing operation.

4. A plow mechanism comprising a frame, support wheels mounted thereon, steering means connected to said wheels, a vertically movable plow support member, a plow, a beam connected to said plow and having vertical and lateral pivotal connection to said plow support member, a draft element, and means connecting said plow support member to said draft element to exert a lifting force on said plow support member during a plowing operation.

5. In a gang plow, a frame, support wheels mounted thereon, a plurality of plow supporting crank shafts journaled on said frame, a plow mounted for vertical and lateral pivotal movement on each of said crank shafts, a ground element wheel supported by said frame in compensating relationship with said plows, means inter-connecting said crank shafts to move said crank shafts in unison, manually actuated means to rotate said crank shafts to vertically move the front ends of said plows, a draft element, means operatively connecting said draft element and said crank shafts to exert a lifting force on said crank shafts during a plowing operation, and means operative during a lifting operation to operatively disconnect said draft element from said crank shaft.

6. In a gang plow, a frame, a plurality of supporting wheels mounted forwardly thereon, a plurality of vertically movable shafts mounted in said frame, a plow connected to each of said shafts to have vertical and horizontal pivotal connection therewith, a ground element wheel mounted rearwardly of said plows and positioned to engage the ground during a plowing operation to oppose side drafts of said plows, manually actuated means connected to vertically move said plow support shafts, a draft element connected to said frame, means interconnecting said draft element and said manually actuated shaft operating means, and means actuatable during a lifting operation of the plow support shafts to operatively disconnect said draft element from said shaft operating means.

7. In a gang plow, a wheeled frame, a plurality of plows mounted for vertical and horizontal pivotal movement on said frame, a side draft compensating ground element carried by said frame, manually actuated means mounted to control vertical movement of the forward ends of said plows, a draft element connected to said frame and to said manually actuated plow control means, and means operative during a lifting of the forward ends of said plows to operatively disconnect said draft element from said plow control means.

8. In a gang plow, a frame support, wheels connected thereto, a plurality of vertically adjustable plow support means mounted on said frame, a plurality of plows having independent, vertical, and horizontal pivotal connection with said plow support means, a draft element connected to said frame, means operatively connecting said plow support means in a lower adjusted position to said draft element to exert an upward force thereon, and means operative during a raising of said plow support means to operatively disconnect said connecting means from said plow support means.

9. In a gang plow, a frame, a plurality of support wheels mounted forwardly thereon, a plurality of plow supporting crank shafts pivotally mounted on said frame, a plow pivoted for vertical and lateral swinging movement on each of said crank shafts, manually operated means connected to said crank shafts to simultaneously rotatably move said crank shafts to vertically move the forward ends of the plows connected thereto, a draft element, a supporting lever for said draft element pivotally mounted on said frame, and lever means operatively connected to said draft element support lever and to said crank shafts to exert an upwardly rotating force thereon during a plowing operation.

10. In a gang plow, a wheeled frame, a draft element mounted on said frame, a plurality of vertically movable plow support members mounted on said frame, a plow having vertical and lateral pivotal connection with each of said plow support members, said plows being mounted on one side of the line of draft from said draft element, a ground element wheel supported rearwardly of said plows and positioned to exert a lateral force on said frame contrary to the side draft of said plows, manually actuated means connected to said plow support members to vertically adjust said members, and means connecting said draft element and said plow support members to exert an upward force on said plow support members.

11. In a gang plow, a wheeled frame, a draft element mounted on said frame, a plurality of vertically movable plow support members mounted on said frame, a plow connected to each of said plow support members to have vertical and lateral pivotal connection therewith, said plows being mounted on one side of the line of draft from said draft element, a ground element wheel supported rearwardly of said plows and positioned to exert a lateral force on said frame contrary to the side draft of said plows, manually actuated means connected to said plow support members to vertically adjust said members, means connecting said draft element and said plow support members to exert an upward force on said plow support members.

12. In a gang plow, a frame, a plurality of support wheels, an axle supporting each wheel and connected to said frame to be free for independent vertical movement with respect to said frame manually controlled adjusting means connected to said frame and to each of said axles to adjust the relative vertical position of said frame with respect to each of said wheels, a plurality of plows mounted on said frame, plow lifting lever means mounted to vertically move the front portions of said plows, a draft element connected to said frame, and means connecting said plow lifting lever means and said draft element to exert a lifting force on the front ends of said plows.

In testimony whereof we affix our signatures.

PAUL HANSMANN.
HERMAN STRACK.